US010178059B1

(12) United States Patent
Garg et al.

(10) Patent No.: US 10,178,059 B1
(45) Date of Patent: Jan. 8, 2019

(54) SYSTEMS AND METHODS FOR PROVIDING SNIPPETS OF CONTENT

(71) Applicant: Amazon Technologies, Inc., Seattle, WA (US)

(72) Inventors: Rohit Garg, Seattle, WA (US); Qifan Xi, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 281 days.

(21) Appl. No.: 14/624,239

(22) Filed: Feb. 17, 2015

(51) Int. Cl.
G06F 15/16 (2006.01)
H04L 12/58 (2006.01)

(52) U.S. Cl.
CPC .................................. *H04L 51/08* (2013.01)

(58) Field of Classification Search
CPC ...................................................... H04L 51/08
See application file for complete search history.

(56) References Cited

U.S. PATENT DOCUMENTS

| 8,769,008 | B1* | 7/2014 | Young | H04W 4/02 709/201 |
| 2010/0262922 | A1* | 10/2010 | Fan | G06Q 10/107 715/752 |
| 2013/0151954 | A1* | 6/2013 | Ierullo | G06F 17/30861 715/254 |
| 2014/0188766 | A1* | 7/2014 | Waldman | G06F 17/30994 705/400 |
| 2014/0215341 | A1* | 7/2014 | Fratti | G06F 17/30056 715/730 |
| 2015/0169696 | A1* | 6/2015 | Krishnappa | G06F 3/04842 707/722 |
| 2015/0346928 | A1* | 12/2015 | MacArthur | G06F 3/04842 715/776 |
| 2016/0070683 | A1* | 3/2016 | Thorn | G06F 17/2288 715/229 |

\* cited by examiner

*Primary Examiner* — Jason D Recek
(74) *Attorney, Agent, or Firm* — Eversheds Sutherland (US) LLP

(57) ABSTRACT

Provided are systems and methods for determining consumable content that is associated with a user, determining a position associated with a location in the content, determining a snippet comprising a sub-portion of the content starting at or near the position and ending at a snippet end position, and sending, to an address associated with the user, an electronic message comprising the snippet.

20 Claims, 6 Drawing Sheets

SYSTEMS AND METHODS FOR PROVIDING SNIPPETS OF CONTENT

BACKGROUND

Consuming content, such as reading books, listening to audio-books and watching movies, can be both entertaining and informative. People often read books for pleasure, taking the time to read a novel, for example, when they can. Unfortunately, people's schedules are often filled with other commitments, such as work, making it difficult to find time to read. Moreover, some people do not have the aptitude to engage in a long reading session. Thus, despite a person wanting to consume content, such as a book, it can be difficult for a person to commit the time needed to consume content that is relatively large in size.

Figure 1:
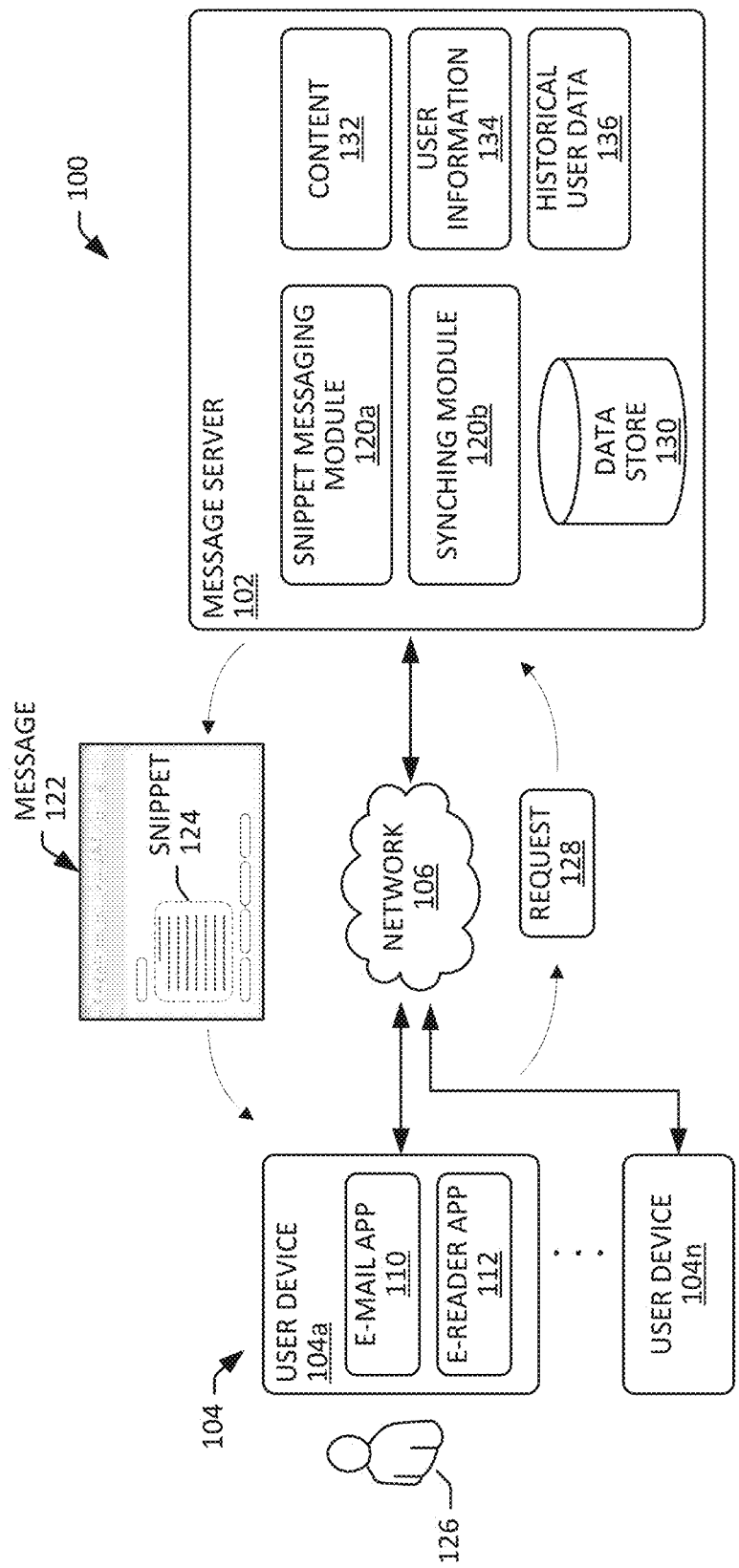
FIG. 1 is a diagram that illustrates an example content distribution environment in accordance with one or more embodiments.

While this disclosure is susceptible to various modifications and alternative forms, specific embodiments thereof are shown by way of example in the drawings and will be described in detail herein. The drawings may not be to scale. It should be understood, however, that the drawings and the detailed description thereto are not intended to limit the disclosure to the particular form disclosed, but to the contrary, the intention is to cover all modifications, equivalents, and alternatives falling within the spirit and scope of the present disclosure as defined by the appended claims.

DETAILED DESCRIPTION

Described herein are systems and methods for providing snippets of content to users. In some embodiments, a snippet of a larger piece of content, such as a few paragraphs of a book, is delivered to a user via a message, such as an electronic mail (e-mail) message or the like. In some embodiments, snippets of content can be provided sequentially, allowing a user to consume a larger piece of content in a progressive manner. For example, in the context of a book, a first e-mail message may include a first snippet that includes the first three pages of the book, a second e-mail message may include a second snippet that includes the next three pages of the book, and so forth. Thus, a user with a busy schedule can consume the smaller portions of snippet content during small breaks in his/her schedule, without having to consciously make an effort to read the book or commit a great deal of time to reading the book. Over time, the user may be able to consume the full piece of content by reading the smaller snippets of the full piece of content. That is, for example, the user may be able to read an entire book, a few paragraphs at a time, by simply reading the snippets automatically e-mailed to him/her.

As described herein, embodiments described can be accomplished using standard client applications or services, such as traditional e-mail applications (e.g., a local e-mail application or a web-based e-mail application), text message applications, voice mail services, and/or the like, and/or specialized client applications or services, such as applications specifically tailored for use in a particular context or with a particular device (e.g., an e-reader application designed for use on an mobile device, such as electronic reader (e-reader) device, a tablet computer and/or a smart phone). As a result, some embodiments can be deployed across a wide variety of platforms, including, for example, distributing snippets of content to users via smart phones, laptop computers, desktop computers, tablet computers, and/or the like. Thus, embodiments that employ a standard client application may not require use of a specialized client side application, such as an e-reader application that is specially designed to track and report user reading positions.

In some embodiments, the sending of snippets of content can be synchronized with content the user has already consumed. For example, a new snippet of content may not be sent to a user until it has been determined that he/she has consumed the previous snippet of content, or otherwise interacted with the snippet of content in a meaningful way. For example, in the context of a snippet of a book sent to a user via an e-mail message, an e-mail message including a second snippet of content may not be sent until it is determined that he/she has at least opened the e-mail, or otherwise interacted with the first snippet of the content.

In some embodiments, the content of a snippet can be determined based on various factors, such as an appropriate snippet beginning/starting position (a "snippet start position"), an appropriate snippet length/size (a "snippet size"), and/or an appropriate snippet stop/ending position (a "snippet stop position"). In some embodiments, the snippet start position can be determined based on a current reading position for the user. A current reading position may refer to a point to which the user has advanced, e.g., read, within the content. For example, in the context of a book, the current reading position may be a line, a paragraph, a page, a chapter and/or the like that the user has read to. If, for example, the last snippet of content included the first five paragraphs of a book, and it was determined that the user read the snippet, then the reading position may be determined to be paragraph 5 of the book. If, for example, the next snippet of content included the next five paragraphs of the book (e.g., paragraphs 6-10 of the book), and it was determined that the user has not yet read the snippet, then the reading position may still be determined to be paragraph 5 of the book. As a further example, if it is determined that the user has read the next snippet, then the reading position may be updated or otherwise determined to be paragraph 10 of the book.

In some embodiments, a current reading position may be synchronized across multiple platforms or devices. For example, if the user is receiving snippets of a book via e-mail messages, and reading the book on another device, such as reading an electronic book (e-book) version of the book on an electronic reader (e-reader) device, and it is determined that the user has read ahead in the e-book to paragraph 33 on page 10 of the book, then the reading position may be updated or otherwise determined to be paragraph 33 of the book.

In some embodiments, a snippet size/length can be determined based on various factors, such as user preferences (e.g., a selected length and/or duration), a user's ability to consume the content (e.g., a user's reading speed), a predetermined size (e.g., a fixed length), natural breaks in the content (e.g., where users typically stop reading), and/or the like. In some embodiments, a user may provide user preferences that can dictate the length of the snippet. If, for example, a user specifies a preferred snippet length of about 5 paragraphs, then each of the snippets delivered to the user may be about 5 paragraphs in length (e.g., 4-6 paragraphs in length). If, for example, a user specifies a preferred reading duration of about 5 minutes, then each of the snippets delivered to the user may be of a length that takes about 5 minutes to read. In some embodiments, the length can be based on the user's reading speed. If for example, it is determined that the user reads about 250 words per minute (wpm), then each of the snippets delivered to the user may be of a length of about 1,250 words (e.g., 5 min*250 words/min=1,250 words). In some embodiments, user preferences can be automatically modified based on historical usage patterns. For example, if a user's length preference is initially set to 3 paragraphs, but the user consistently (e.g., more than a majority of the time) request to view two snippets (thereby reading a total of six paragraphs during reading session), then the length preference for the user may be automatically changed to 6 paragraphs. In some embodiments, a machine learning algorithm can assess historical user data, including the past usage data for a user or other users, to determine preferences for the user.

In some embodiments, the snippet size/length can be determined (or otherwise dictated by) natural breaks in the content. Natural breaks may include the location in the content where users typically stop. If, for example, it is determined that a relatively high percentage of users (e.g., a majority of users) stop reading at the end of chapter 1 of a book, then the end of chapter 1 may be identified as a natural break. If, for example, it is determined that a relatively high percentage of users stop reading at the end of paragraph 33 of a book, then the end of paragraph 33 may be identified as a natural break. In some instances, natural breaks can be identified based on historical reading data for one or more users. For example, a machine learning algorithm may assess historical user data, including the locations in a book where people stop reading, to determine various natural breaks in the book. In some embodiments, the end of a snippet may be aligned with a natural break point. If, for example, natural break points are identified at the end of paragraphs 33, 50, 56, 75 and so forth, and a user's reading position is 45, then a snippet that includes paragraphs 46-56 may be generated and sent to the user. In some embodiments, the end of the snippet may be aligned with a natural break point that occurs at or near a preferred length or may be aligned with a preferred duration. If, for example, the user specifies a preferred snippet length of about 10 paragraphs, natural break points are identified at the end of paragraphs 33, 50, 56, 75 and so forth, and the user's reading position is 45, then a snippet that include paragraphs 46-56 may be generated and sent to the user.

In some embodiments, historical user data can include usage data for one or more users obtained from one or more sources. For example, in the context of users reading e-books using electronic devices, such as computers, smartphones, e-reader devices and/or the like, applications on the devices that are used to view or otherwise interact with the content of the e-book can provide information relating to the users' interaction with the content. If for example, a user reads to paragraph 56 in an e-book in using an e-reader application, then the e-reader application may report this reading position to a device, such as a server, monitoring user reading stop positions. Similar data can be collected in a similar manner for any number of users, and the collected data can be aggregated to determine various information and metrics. For example, historical user data, such as different locations where users have stopped reading within an e-book can be collected, aggregated, and processed to identify natural breaks in the e-book, and these natural breaks can be used to identify a snippet end as described herein. Thus, characteristics of a snippet provided to a user can be determined based on historical user data collected for the user and/or one or more other users.

In some embodiments, a message containing a snippet (also referred to as a "snippet message" or "message") can include various elements that enable assessment of a user's interaction with the snippet and provide the user with access to related content and/or the like. In some embodiments, a snippet message can include a "beacon" (also referred to as an "image tag" or "pixel tag") that is embedded in the message. Such a beacon may be, for example, a transparent graphic image (e.g., a 1 pixel×1 pixel image) that is placed in the body of the snippet message (e.g., in the body of an e-mail message including the snippet). The HTML code for the beacon may point to a site (e.g., a message server) to retrieve the image, such that when the snippet message is opened, the application used to view the message may send a request for the image to the site. The request may include embedded information that is unique to the snippet message such that the site (e.g., the message server) can determine that the message has been opened and/or the snippet has been read by the user based on receipt of the request. In some embodiments, other information can be used to determine if the user has read the snippet. For example, an application displaying the snippet message may provide an indication of whether or not the user has read the message, how long the user has viewed the message, how far the user has scrolled in the message, and/or the like. In some embodiments, it may be determined whether the user has read the snippet based on such interactions. For example, it can be determined that a user has read a snippet message in response to receiving a read receipt from an application on the user device (e.g., an e-mail read receipt provided by the e-mail application used by the user to open and/or view the snippet message). For example, it may be determined that the user has read the snippet if the user has opened the snippet message, the user has viewed the message for at least a threshold amount of time (e.g., at least 1 min), and/or the user has scrolled through at least a threshold amount of the message (e.g., at least through 95% of the message). Thus, the status of whether or not a user has read a snippet message can be accomplished using standard client applications or services, such as traditional e-mail applications (e.g., a local e-mail application or a web-based e-mail application), text message applications, voice mail services, and/or the like.

In some embodiments, a snippet message can include elements that enable a user to specify whether the user has read the snippet. For example, a snippet message may include a "Snippet Read" button (or other element such as a link). The user can select the "Snippet Read" button to indicate that he/she has read the snippet. As described herein, if the user selects the "Snippet Read" button, the user's read position may be updated to align with the end of the snippet. Further, a snippet message can include a "Snippet Not Read" button (or other element such as a link). The user can select the "Snippet Not Read" button to indicate that he/she has not read the snippet, or at least does not want the system to update his/her reading position to the end of the snippet. As described herein, if the user selects the "Snippet Not Read" button, the user's read position may not be updated to align with the end of the snippet (e.g., the user's read position may remain aligned with the beginning of the snippet). A snippet message can include a "Send Next Snippet Now" button (or other element, such as a link). The user can select the "Send Next Snippet Now" button to indicate that he/she has read the snippet and is ready to receive the next snippet. As described herein, if the user selects the "Send Next Snippet Now" button, the user's read position may be updated to align with the end of the snippet in the snippet message, and another snippet message containing a next snippet may be sent to the user. Such a follow-up may be sent immediately, such that the user can continue to read snippets of the content. This may allow the user to read multiple snippets in sequence if, for example, he/she has the time to read multiple snippets in a sitting.

In some embodiments, a user may be able to indicate his/her interactions or desires via responses to a snippet message. For example, a user may simply send a reply message with the string "sr" in the body of the reply to indicate that they have read the snippet. This may have the same effect as selection of the "Snippet Read" button described above. A user may simply send a reply message with the string "snr" in the body of the reply to indicate that he/she has not read the snippet. This may have the same effect as selection of the "Snippet Not Read" button described above. Further, a user may simply send a reply message with the string "snsn" in the body of the reply to indicate that he/she has read the snippet and is ready to receive the next snippet. This may have the same effect as selection of the "Send Next Snippet Now" button described above.

In some embodiments, a snippet message can include one or more elements that enable a user to access content related to the snippet. For example, a snippet message may include an element (e.g., a button) that enables a user to navigate to a full version of the content, such as a book, including the snippet. For example, a snippet message may include a "Continue Reading" button (or other element such as a link). The user can select the "Continue Reading" button to indicate that he/she would like to continue to read the full content of the book. As described herein, if the user selects the "Continue Reading" button, the user's read position may be updated to align with the end of the snippet, and the user may be directed to an electronic version of the book (an e-book version of the book). For example, if a user is accessing an e-mailed snippet message via an e-mail site using an Internet browser application of a user device, such as a desktop computer, if the user selects the "Continue Reading" button, then the browser may navigate to a web page that includes access to the full text of the book. If a user is accessing an e-mailed snippet message via a device that has access to an e-reader application, such as an e-reader device, the e-reader application may navigate to a page of the e-book version of the book, and provide access to the full text of the book. The text initially displayed may include text starting at or near the reading position for the user. For example, the browser or the e-reader application may navigate to a full text of the book that includes text starting at or near the snippet start position or the snippet end position, such as a page of the e-book that includes text starting at or near the snippet start position or the snippet end position. Including the snippet in the full text may enable a user to easily identify where he/she left off. In some embodiments, an indicator aligned with the snippet end position may be embedded in the full text such that the user can easily identify where he/she left off after reading the snippet.

In some embodiments, a snippet message can include an element (e.g., a button) that enables a user to navigate to supplemental content, such as commentary, products, and/or the like related to the snippet and/or the full content, such as a book. For example, a snippet message may include a "See Supplemental Content" button (or other element such as a link). The user can select the "See Supplemental Content" button to indicate that he/she would like to access additional content related to the book. As described herein, if the user selects the "See Supplemental Content" button, the user's read position may be updated to align with the end of the snippet, and the user may be directed to a page of the book that includes supplemental content, and/or one or more links to different types of supplemental content. Supplemental content may include commentary on the book (e.g., articles about the book, reviews of the book, summaries of the book, related books, wiki pages about the book, and/or the like), and products related to the book (e.g., items for sale that are related to the book and/or the like).

In some embodiments, a snippet message can include an option to receive a recap (e.g., a summary or a synopsis) of the context of the snippet (e.g., what led up to the snippet). Such a recap may be useful, if, for example, a user has not read a snippet of a book for a long period of time and has forgotten what has happened in the portion of the book leading up to the snippet. For example, a snippet message may include a "Recap" button (or other element such as a link). The user can select the "Recap" button to indicate that he/she would like to receive a recap of the circumstances leading up to the snippet. As described herein, if the user selects the "Recap" button, a recap may be generated and provided to the user. For example, a recap may be generated, and a snippet message including the snippet and a recap of the circumstances leading up to the snippet (also referred to as a "recap message") may be sent to the user. Thus, the user may be able to open the recap message, read the recap, and proceed to reading the snippet. Such a recap message may include other elements/features that are the same or similar to those of the snippet messages described herein (e.g., a recap message may include a "Snippet Read" button, a "Snippet Not Read" button, a "Send Next Snippet Now" button, and/or the like), and/or the user may be able to indicate his/her interactions or desires via responses to the recap message (e.g., via replies of "sr," "snr," and/or "snsn").

In some embodiments, a follow-up snippet message may be sent automatically, e.g., without an explicit user request. For example, a follow-up message may be sent if it is determined that the user has not read a snippet within a threshold amount of time. If, for example, a snippet message has been sent to a user, a recap threshold is set for 5 days, and it is determined that the user has not read the snippet within 5 days of receiving the message, then the snippet message and/or a recap snippet message may be sent to the user. This may provide a reminder to the user to read the snippet, and/or a reminder of the context of the snippet.

In some embodiments, a point in time to send a snippet message can be determined based on various factors, such as user requests for a snippet (e.g., the user selects the "Send Next Snippet Now" button in a message), interaction with the last snippet message (e.g., whether the user has read the last snippet sent to him/her), user preferences (e.g., a preferred time and/or frequency), a user's historical reading patterns (e.g., when does the user typically read the snippet messages), and/or the like. In some embodiments, a snippet message can be sent in response to a user's explicit request for a snippet of content. For example, a snippet message, including a snippet including paragraphs 5-10 of a book, may be sent to the user in response to the user selecting a "Send Next Snippet Now" button in the snippet message including paragraphs 1-5 of the book.

In some embodiments, a snippet message can be sent in response to how the user interacts (or does not interact) with the last snippet message. For example, a message with a snippet including paragraphs 5-10 of a book may be sent to the user in response to determining that the user has read a snippet including paragraphs 1-5 of the book (e.g., the user opened a snippet message including the snippet containing paragraphs 1-5 of the book). As a further example, a follow-up message (e.g., a resend of the message including a snippet containing paragraphs 1-5 of the book, or a recap message) may be sent to the user in response to determining that the user has not read the snippet containing paragraphs 1-5 of a book within a threshold period of time (e.g., 5 days) of a snippet message.

In some embodiments, a snippet message can be sent in accordance with user preferences, such as a time or frequency. For example, if a user sets account preferences that indicate a message time of 8:00 a.m. and a max frequency of daily, then a snippet message may be sent to the user at about 8:00 a.m., daily. If, for example, a snippet message including a snippet containing paragraphs 1-5 of a book is sent to the user at 8:00 a.m. on Monday, and it is determined that user read the snippet at about 9:00 a.m. on Monday, then another snippet message including a snippet containing paragraphs 6-10 of the book may be sent to the user at 8:00 a.m. on Tuesday.

In some embodiments, a snippet message can be sent in accordance with a user's historical reading patterns. This may include, for example, times when users typically read snippets, locations where users typically read snippets, activities during which users typically read snippets, and/or the like. For example, if it is determined that a user reads at least a threshold amount (e.g., greater than about 50%) of the snippets sent to him/her between about 8:00 a.m. and 9:00 a.m., then a snippet message may be sent to him/her at about 8:00 a.m. so that it will be available to him/her during the time period when he/she is likely to read it. In some instances, such preferred reading times can be identified based on historical reading data for one or more users. For example, a machine learning algorithm may assess historical user data including when the user reads the snippets sent to him/her to identify preferred reading times for the user. As a further example, if it is determined that a user reads at least a threshold amount (e.g., greater than about 50%) of the snippets sent to him/her while he/she is at a given location, such as at his/her work location, then snippet messages may be sent to him/her when it is determined that he/she is at or near that location so that it will be available to him/her during the time period when he/she is likely to read it. In some instances, such locations can be identified based on historical location and reading data for one or more users. For example, a machine learning algorithm may assess historical user data including where a user is located when the user reads the snippets sent to him/her to identify preferred reading locations for the user. As another example, if it is determined that a user reads at least a threshold amount (e.g., greater than about 50%) of the snippets sent to him/her while he/she is engaged in a given activity, such as riding a bus, then a snippet message may be sent to him/her when he/she is engaged in that activity so that it will be available to him/her during the time period when he/she is likely to read it. In some instances, such activities can be identified based on historical activity and reading data for one or more users. For example, a machine learning algorithm may assess historical user data including where the user is located and what the user is doing when the user reads the snippets sent to him/her to identify preferred reading activities for the user.

Accordingly, embodiments described herein may enable a user with a busy schedule to consume smaller portions of snippet content (e.g., a few paragraphs of a book) during small breaks in his/her schedule (e.g., when reading e-mail), while allowing the user to take in larger portions of the content when his/her schedule allows (e.g., reading a few chapters of the book in the evening). Although certain embodiments are described with regard to particular types of content (e.g., books) and/or particular types of delivery mechanisms (e.g., e-mail messages) for the purpose of illustration, embodiments may include various types of content and/or delivery mechanisms. For example, a snippet of a book may be delivered to a user via a text message in place of and/or in parallel with delivery of the snippet via an e-mail message. A text message may include a message (e.g., containing text, image, video, sound content and/or the like) sent or delivered via a Short Message Service (SMS) or a Multimedia Messaging Service (MMS). As a further example, a snippet of a book may be delivered to a user in an audio format, such as an audible reading of the text of the snippet (e.g., a snippet of an audio-book). Such an audio snippet may be delivered as an audio file attached to a message (e.g., attached to an e-mail or a text message). In some embodiments, such an audio file may be delivered via a call to the user and/or a voice mail left for the user. Thus, for example, a user may listen to an audio version of a snippet while traveling.

FIG. 1 is a diagram that illustrates an example content distribution environment ("environment") 100 in accordance with one or more embodiments. The environment 100 may include a message server 102 and/or one or more client or user devices 104 (e.g., user devices 104a-104n) communicatively coupled via a communications network 106.

The network 106 may include an element or system that facilitates communication between the entities of the environment 100. For example, the network 106 may include an electronic communications network such as the Internet, a local area network (LAN), a wide area network (WAN), a wireless local area network (WLAN), a cellular communications network, and/or the like. In some embodiments, the network 106 can include a single network or a combination of networks.

A user device 104 may include any variety of electronic devices, such as one or more electronic computing devices. A user device 104 may include, for example, a desktop computer, and/or one or more mobile computing devices, such as a laptop computer, a tablet computer, an electronic reader (e-reader), a personal digital assistant (PDA), a smart phone, a wearable computer device (e.g., a smart watch), and/or the like. In some embodiments, a user device 104 can include a networked device capable of communicating information via the network 106. A user device 104 may be a client of the message server 102. In some embodiments, a user device 104 may include various input/output (I/O) interfaces, such as a display screen (e.g., for displaying graphical user interfaces (GUIs)), an audible output interface (e.g., a speaker), an audible input interface (e.g., a microphone), an image acquisition interface (e.g., a camera), a biometric interface (e.g., an eye or fingerprint scanner), a keyboard, a pointer/selection device (e.g., a mouse, a trackball, a touchpad, a touchscreen, a stylus or the like), a printer, and/or the like. In some embodiments, a user device 104 can include general computing components and/or embedded systems optimized with specific components for performing specific tasks. A user device 104 may include, for example, an e-mail application 110 (e.g., an Internet browser application for accessing e-mail via the Internet and/or a devoted e-mail application) for accessing e-mail messages, an e-reader application 112 for accessing textual content such as e-books, and/or the like. In some embodiments, the programs or applications of a user device 104 include modules having program instructions that are executable by a computer system to perform some or all of the functionality described herein with regard to the user device 104. In some embodiments, a user device 104 can include one or more computer systems similar to that of the computer system 1000 described below with regard to at least FIG. 5.

The message server 102 may include an electronic computing device having network connectivity and capable of providing one or more services to network clients, such as the user devices 104. These services may include receiving, processing, storing, and/or serving or otherwise providing data. Although certain embodiments are described with regard to a single server for the purpose of illustration, embodiments may include employing multiple servers, such as a plurality of distributed servers. In some embodiments, a message server 102 can include one or more computer systems similar to that of the computer system 1000 described below with regard to at least FIG. 5.

In some embodiments, the message server 102 can include a snippet messaging module 120a and/or synching module 120b. As described herein, the snippet messaging module 120a may provide for generating and/or sending snippet messages ("messages") 122, including snippets of content ("snippets") 124, to the user devices 104 for viewing by one or more users 126. A snippet of content ("snippet") 124 may include a sub-portion of a larger piece of content, such as content 132. For example, a snippet 124 of a book (e.g., that includes hundreds of pages, multiple chapters, hundreds of paragraphs, and thousands of lines of text) may include a chapter of the book, one or more paragraphs of the book, one or more pages of the book, a few lines of text of the book, and/or the like. The snippet messaging module 120a may also provide for receiving and/or processing a request 128 received from one or more user devices 104, such as image requests received in response to users opening messages 122 having beacons embedded therein, requests received in response to users selecting interactive elements of the messages 122, and/or the like. The synching module 102b may provide for synchronizing the read positions for the users 126 across various platforms. For example, the synching module 120b may track a current read position for a user 126 based on what snippets 124 he/she has read in the snippet messages 122, what content he/she has read on an e-reader user device 104, and/or the like.

In some embodiments, the message server 102 may include or otherwise have access to a data store 130. A data store 130 may include a non-transitory computer-readable medium for storing data thereon. The data store 130 may, for example, store the snippet messaging module 120a, the synching module 120b, the content 132 (e.g., the full content of one or more e-books), the user information 134 (e.g., the reading positions for one or more users 126, the reading speeds for one or more users 126, the preferences for one or more users 126, and/or the like), and the historical user data 136 (e.g., historical data indicating where one or more users 126 stopped reading, when/where one or more users 126 read snippets 124, and/or the like). Although certain embodiments are described with regard to a single data store 130 for the purpose of illustration, embodiments may include employing multiple data stores 130, such as a plurality of distributed data stores 130.

In some embodiments, the snippet messaging module 120a can send a snippet 124 of the content 132, such as a few paragraphs of a book, for consumption by a user 126. For example, the snippet messaging module 120a may e-mail a message 122 that includes a snippet 124 containing several paragraphs of a book to an e-mail account for the user 126. In some embodiments, the snippets 124 of the content 132 can be provided sequentially, allowing the user 126 to consume some or all of the content 132 in a progressive manner. For example, where the content 132 includes a book, the snippet messaging module 120a may e-mail a first message 122 including a first snippet 124 containing pages 1-3 of the book, and later e-mail a second message 122 that includes a second snippet 122 containing pages 4-6 of the book, and so forth.

In some embodiments, the snippet messaging module 120a can synchronize the sending of snippets 124 of the content 132 with portions of the content 132 that the user 126 has already consumed. For example, the snippet messaging module 120a may not send a new snippet 124 of the content 132 to the user 126 until the snippet messaging module 120a determines that the user 126 has consumed the previous snippet 124 of the content 132, or otherwise interacted with the snippet 124 in a meaningful way. For example, the snippet messaging module 120a may not e-mail a second message 122 including the next snippet 124 of the content 132 to the user's e-mail account until it is determined that the user 126 has at least opened the first message 122 e-mailed to him/her, or otherwise interacted with the snippet 124 in the first message e-mailed to him/her.

In some embodiments, the snippet messaging module 120a may determine the portion of the content 132 to be included in the snippet 124 based on various factors, such as an appropriate snippet beginning/starting position (a "snippet start position"), an appropriate snippet length/size (a "snippet size"), and/or an appropriate snippet stop/ending position (a "snippet stop position").

In some embodiments, the snippet messaging module 120a can determine the snippet start position based on a current reading position for the user 126. If, for example, the last snippet 124 of the content 132 included paragraphs 1-5 of a book, and it was determined that the user 126 read the last snippet 124 of the content 132, then the reading position for the user 126 may be determined to be paragraph 5 of the book. If, for example, the next snippet 124 of the content 132 included paragraphs 6-10 of the book, and it is determined that the user 126 has not yet read the next snippet 124 of the content 132, then the reading position for the user 126 may still be determined to be paragraph 5 of the book. As a further example, if it is determined that the user 126 has read the next snippet 124 of the content 132, then the reading position for the user 126 may be updated or otherwise determined to be paragraph 10 of the book.

In some embodiments, a current reading position can be synchronized across multiple platforms or devices. For example, if a user 126 is both receiving snippets 124 of the content 132 for a book via e-mailed messages 122 and reading the content 132 of the book on another user device 104, such as reading an electronic book (e-book) version of the book on an electronic reader (e-reader) user device 104, and it is determined that the user 126 has read ahead in the e-book to paragraph 33 on page 10 of the book, then the reading position for the user 126 may be determined to be paragraph 33 of the book. In some embodiments, the reading position for one or more users 126 can be synchronized or otherwise determined by the synching module 120b. For example, the synching module 120b may receive indications of current reading positions for the users 126, determine the current reading positions for the users 126 based on the indications, and store the reading position for each of the users 126 in the user information 134. If, for example, the snippet messaging module 120a determines that a user 126 has read the snippet 124 of the content 132 that includes paragraphs 1-5 of a book, then the snippet messaging module 120a may send to the synching module 120b a reading stop position indicating paragraph 5 of the book. The synching module 120b may update the stored reading position for the user 126 to be paragraph 5 of the book. If, for example, the e-reader application 112 on the e-reader user device 104 determines that the user 126 has read to paragraph 50 of the book, then the e-reader application 112 may send to the synching module 120b a reading stop position indicating paragraph 50 of the book. The synching module 120b may, then, update the stored reading position for the user 126 to paragraph 50 of the book.

In some embodiments, the snippet messaging module 120a can determine the size of a snippet 124 based on various factors, such as preferences of a user 126 (e.g., a selected length or duration), the ability of the user 126 to consume the content 132 (e.g., the reading speed of the user 126), a predetermined size (e.g., a fixed length), natural breaks in the content 132 (e.g., where users 126 typically stop reading), and/or the like. In some embodiments, a user 126 may provide user preferences that can dictate the size of a snippet 124. If, for example, a user 126 specifies a preferred snippet length of about 5 paragraphs, then the snippet messaging module 120a may generate snippets 124 that are about 5 paragraphs in length (e.g., 4-6 paragraphs in length), and include the snippets 124 in the messages 122 that it sends to the user 126. If, for example, a user specifies a preferred reading duration of about 5 minutes, then the snippet messaging module 120a may generate snippets 124 that are of a length that is estimated to take about 5 minutes for the user 126 to read, and include the snippets 124 in the messages 122 that it sends to the user 126. In some embodiments, the length can be based on a reading speed of the user 126. If, for example, it is determined that the user 126 reads about 250 words per minute (wpm), then the snippet messaging module 120a may generate snippets 124 having a length of about 1,250 words (e.g., 5 min*250 words/min=1, 250 words), and include the snippets 124 in the messages 122 that it sends to the user 126.

In some embodiments, the snippet messaging module 120a can determine the size of a snippet 124 based on (or otherwise dictated by) natural breaks in the content 132. Natural breaks may include locations in the content 132 where users typically stop reading. If, for example, it is determined that a relatively high percentage of users 126 (e.g., a majority of users 126) stop reading at the end of chapter 1 of a book, then the end of chapter 1 may be identified as a natural break in the book. If, for example, it is determined that a relatively high percentage of users 126 stop reading at the end of paragraph 33 of a book, then the end of paragraph 33 may be identified as a natural break in the book. In some instances, natural breaks can be identified based on historical reading data for one or more users 126. For example, a machine learning algorithm may assess historical user data 136, including the locations in a book where users 126 stop reading, to determine various natural breaks in the book. In some embodiments, the end of the snippet 124 may be aligned with a natural break in the content 132. If, for example, natural break points are identified at the end of paragraphs 33, 50, 56, 75 and so forth of a book, and the reading position for the user 126 is paragraph 45 of the book, then the snippet messaging module 120a may generate a snippet 124 that includes paragraphs 46-50, and include the snippet 124 in a message 122 that it sends to the user 126. In some embodiments, the end of the snippet 124 may be aligned with a natural break point that occurs at or near a preferred length or aligns with a preferred duration. If, for example, a user 126 specifies a preferred snippet length of about 10 paragraphs, natural break points are identified at the end of paragraphs 33, 50, 56, 75 and so forth, and the reading position for the user 126 is paragraph 45, then the snippet messaging module 120a may generate a snippet 124 that includes paragraphs 46-56, and include the snippet 124 in a message 122 that it sends to the user 126.

Figure 2A:
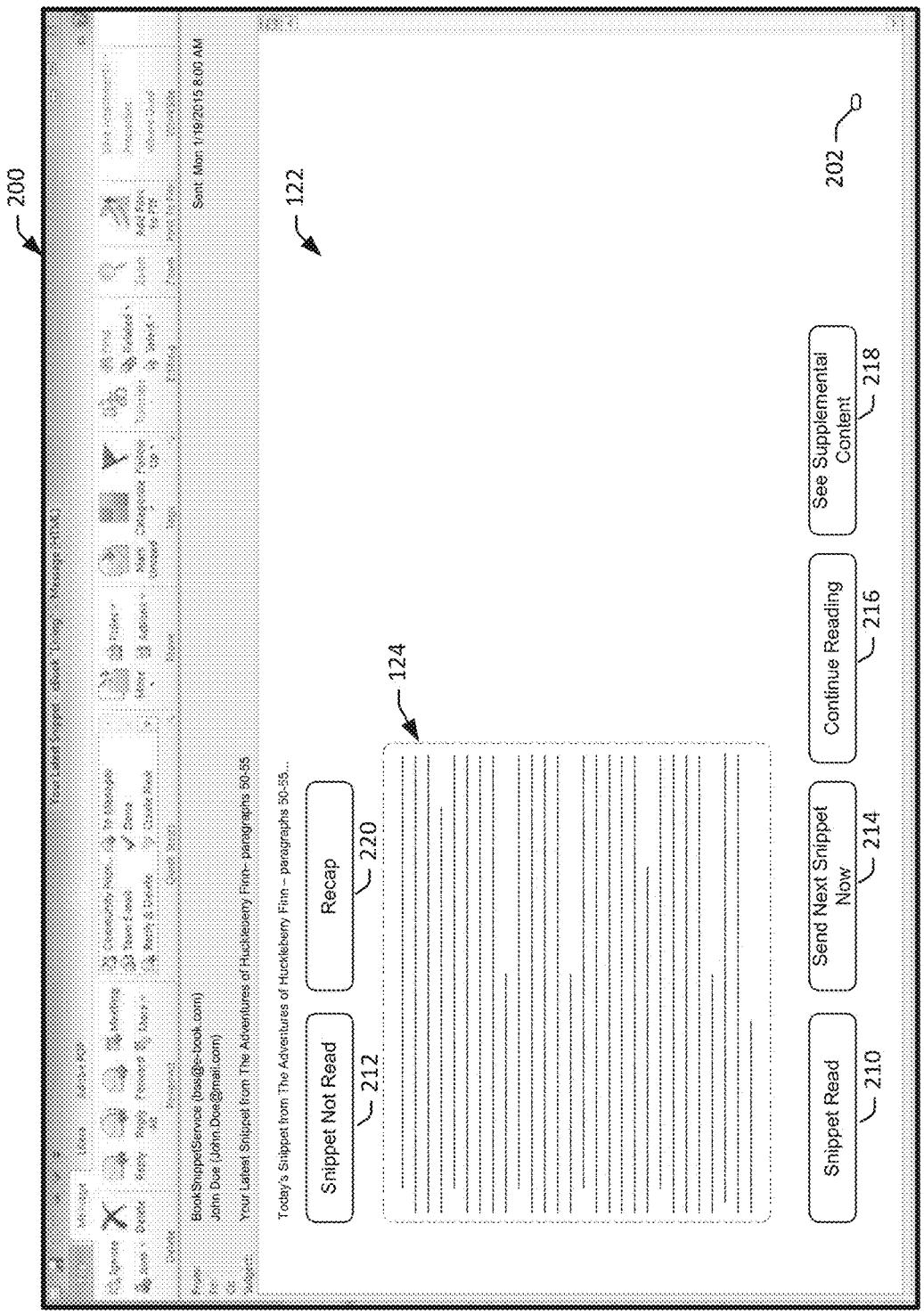
FIG. 2A illustrates an example graphical user interface (GUI) displaying a snippet message in accordance with one or more embodiments.

In some embodiments, a message 122 can include various elements that enable an assessment of interaction with the message 122 by the user 126, that provides the user 126 with access to related content, and/or the like. FIG. 2A illustrates an example GUI 200 displaying an e-mailed snippet message 122 in accordance with one or more embodiments. As illustrated, a body of the message 122 may include a snippet 124. In some embodiments, the message 122 can be generated by the snippet messaging module 120a, and the snippet messaging module 120a may send the message 122 (via e-mail) to the e-mail account for the user 126. The user 126 may access the snippet message 122 by, for example, logging into his/her e-mail account using the e-mail application 110 of the user device 104, and selecting to open the message 122. Upon opening the message 122, the e-mail application 110 may cause the user device 104 to display a GUI similar to that of the GUI 200.

In some embodiments, the message 122 can include a beacon 202 (also referred to as an "image tag" or a "pixel tag") that is embedded in the message 122. Such a beacon 202 may be, for example, a transparent graphic image (e.g., a 1 pixel×1 pixel image) that is placed in the message 122. The HTML code for the beacon 202 may point to a site (e.g., the message server 102) to retrieve the image, such that when the message 122 is opened, the e-mail application 110 may send a request 128 for the image to the site (e.g., send a request 128 for the image to the snippet messaging module 120a of the message server 102). The request 128 may include embedded information that is unique to the message 122 such that the site (e.g., the snippet messaging module 120a of the message server 102) can determine that the snippet message 122 has been opened and/or the snippet 124 has been read by the user 126 based on receipt of the request 128. In some embodiments, other information can be used to determine whether the user 126 has read the snippet 124. For example, the e-mail application 110 may provide to the message server 102 an indication of whether or not the user 126 has read the message 122, how long the user 126 has viewed the message 122, how far the user 126 has scrolled through the message 122, and/or the like. In some embodiments, it may be determined whether the user 126 has read the snippet 124 based on such interactions. For example, the snippet messaging module 120a may determine that the user 126 has read the snippet 124 in response to receiving a read receipt (e.g., an e-mail read receipt provided by the e-mail application 110 used by the user 126 to open and/or view the message 122). For example, the snippet messaging module 120a may determine that the user 126 has read the snippet 124 if the user 126 has opened the message 122, the user 126 has viewed the message 122 for at least a threshold amount of time (e.g., at least 1 min), and/or the user 126 has scrolled through at least a threshold amount of the message 122 (e.g., at least through 95% of the message 122). Thus, the status of whether or not the user 126 has read a message 122 can be accomplished using standard client applications or services, such as traditional e-mail applications 110 (e.g., a local e-mail application or a web-based e-mail application), text message applications, voice mail services, and/or the like. Accordingly, some or all of the embodiments described herein may not require use of a specialized client side application, such as an e-reader application 112 that is specially designed to track and report user reading positions.

In some embodiments, the message 122 may include elements that enable the user 126 to specify whether the user 126 has read the snippet 124. For example, the message 122 may include a "Snippet Read" button 210 (or other element such as a link). The user 126 can select the "Snippet Read" button 210 to indicate that he/she has read the snippet 124 in the message 122. As described herein, if the user 126 selects the "Snippet Read" button 210, a corresponding request 128 may be sent to the snippet messaging module 120a, and the snippet messaging module 120a may initiate updating the read position for the user 126 to align with the end of the snippet 124 (e.g., the snippet messaging module 120a may send an indication of the location of the end of the snippet 124 to the synching module 120b). Further, the message 122 may include a "Snippet Not Read" button 212 (or other element such as a link). The user 126 can select the "Snippet Not Read" button 212 to indicate that he/she has not read the snippet 124 in the message 122, or at least does not want the system to update his/her reading position to the end of the snippet 124. As described herein, if the user 126 selects the "Snippet Not Read" button 212, a corresponding request 128 may be sent to the snippet messaging module 120a, and the snippet messaging module 120a may not initiate updating the read position for the user 126 to align with the end of the snippet 124 (e.g., the snippet messaging module 120a may not send an indication of the location of the end of the snippet 124 to the synching module 120b). The message 122 may include a "Send Next Snippet Now" button 214 (or other element, such as a link). The user 126 can select the "Send Next Snippet Now" button 214 to indicate that he/she has read the snippet 124, and is ready to receive the next snippet 124. As described herein, if the user 126 selects the "Send Next Snippet Now" button 214, a corresponding request 128 may be sent to the snippet messaging module 120a, the snippet messaging module 120a may initiate updating the read position for the user 126 to align with the end of the snippet 124 (e.g., the snippet messaging module 120a may send an indication of the location of the end of the snippet 124 to the synching module 120b), and the snippet messaging module 120a may generate another message 122 containing the next snippet 124 and send that message 122 to the the user 126. Such a follow-up message 122 may be sent immediately, such that the user 126 can continue to read snippets 124 of the content 132. This may allow the user 126 to read multiple snippets 124 in sequence if, for example, he/she is interested in reading multiple book snippets 124 in a single sitting.

In some embodiments, a user 126 can indicate his/her interactions or desires via responses to a message 122. For example, the user 126 may simply send a reply to a message 122 that includes the string "sr" in the body of the reply to indicate that he/she has read the snippet 124. This may have the same effect as selection of the "Snippet Read" button 210 described above. The user 126 may simply send a reply to a message 122 that includes the string "snr" in the body of the reply to indicate that he/she has not read the snippet 124. This may have the same effect as selection of the "Snippet Not Read" button 212 described above. Further, the user 126 may simply send a reply to a message 122 that includes the string "snsn" in the body of the reply to indicate that he/she has read the snippet 124, and is ready to receive the next snippet 124. This may have the same effect as selection of the "Send Next Snippet Now" button 214 described above.

In some embodiments, a message 122 may include one or more elements that enable a user to access content related to the snippet 124. The message 122 may include an element (e.g., a button) that enables the user 126 to navigate to a full version of the content 132 including the snippet 124. For example, the message 122 may include a "Continue Reading" button 216 (or other element such as a link). The user 126 can select the "Continue Reading" button 216 to indicate that he/she would like to continue reading the full content 132 of the book. As described herein, if the user 126 selects the "Continue Reading" button 216, a corresponding request 128 may be sent to the snippet messaging module 120a, the snippet messaging module 120a may initiate updating the read position for the user 126 to align with the end of the snippet 124 (e.g., the snippet messaging module 120a may send an indication of the location of the end of the snippet 124 to the synching module 120b), and the snippet messaging module 120a may redirect to display an electronic version of the book (the e-book). For example, if the user 126 is accessing the message 122 via an Internet browser of the user device 104, such as a desktop computer, then the snippet messaging module 120a may direct the browser to navigate to a web page that includes text at or near the location of the snippet 124 and/or provides access to the full text of the book. If the user 126 is accessing the message 122 via a user device 104 that has access to an e-reader application 112, such as an e-reader device, then the snippet messaging module 120a may direct the e-reader application 112 to navigate to a page of the e-book at or near the location of the snippet 124, and/or provide access to the full text of the book. The text initially displayed may include text starting at or near the reading position for the user 126. For example, the browser or the e-reader application 112 may navigate to a full text of the book that includes text starting at or near the snippet start position or the snippet end position of the snippet 124, such as a page of the e-book that includes text starting at the snippet start position or the snippet end position of the snippet 124. Including the snippet 124 in the full text may enable the user 126 to easily identify where he/she left off. In some embodiments, an indicator aligned with the end position of the snippet 124 may be embedded in the full text such that the user 126 can easily identify where he/she left off reading the snippet 124.

The message 122 may include an element (e.g., a button) that enables the user 126 to navigate to supplemental content, such as commentary, products, and/or the like related to the snippet 124 and/or the full content 132. For example, the message 122 may include a "See Supplemental Content" button 218 (or other element such as a link). The user 126 can select the "See Supplemental Content" button 218 to indicate that he/she would like to access additional content related to the book. As described herein, if the user 126 selects the "See Supplemental Content" button 218, a corresponding request 128 may be sent to the snippet messaging module 120a, the snippet messaging module 120a may initiate updating the read position for the user 126 to align with the end of the snippet 124 (e.g., the snippet messaging module 120a may send an indication of the location of the end of the snippet 124 to the synching module 120b), and the snippet messaging module 120a may redirect to display a page that includes supplemental content, and/or one or more links to different types of supplemental content. Supplemental content can include, for example, commentary on the book (e.g., articles about the book, reviews of the book, summaries of the book, related books, wiki pages about the book, and/or the like), and products related to the book (e.g., items for sale that are related to the book and/or the like).

In some embodiments, the message 122 can include some or all of preceding snippets 124. For example, referring to FIG. 2A, the message 122 may include a listing of one or more of the snippets 124 previously sent to the user 126. If, for example, the three snippets 124 preceding the currently provided snippet 124 are to be provided, and the current snippet 124 displayed at or near the top of the body of the message 122 is the $10^{th}$ snippet provided to the user 126, then the body of the message 122 may also include the $9^{th}$, $8^{th}$ and $7^{th}$ snippets 124 displayed below the $10^{th}$ snippet 124. Such an embodiment may enable a user to refer back to earlier portions of the content 132, including the earlier snippets 124, as needed. For example, a user may simply scroll down in a message 122 with a snippet 124 to view some or all of the preceding snippets 124.

Figure 2B:
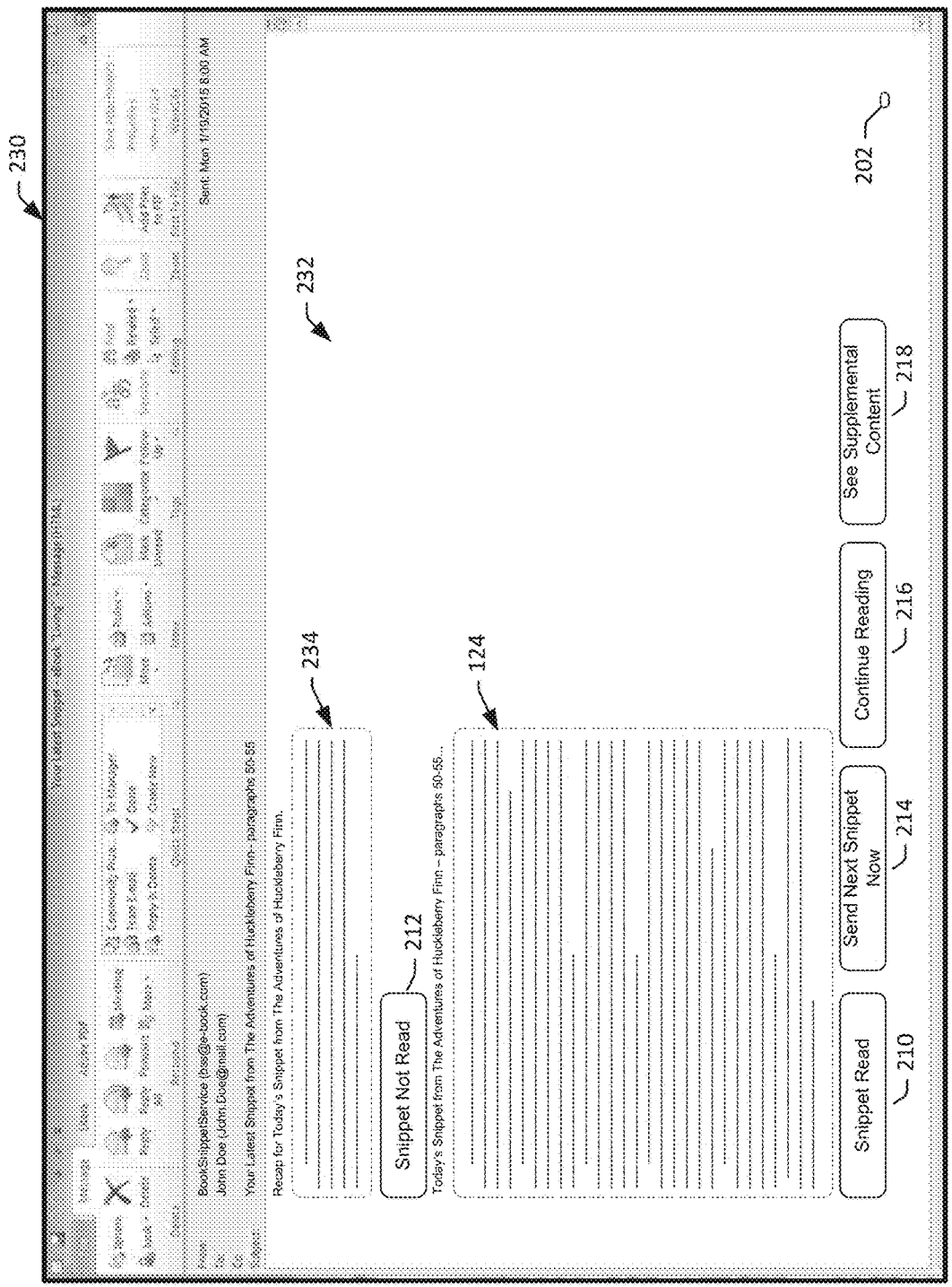
FIG. 2B illustrates an example GUI displaying a recap message in accordance with one or more embodiments.

In some embodiments, the message 122 can include an option to receive a recap (e.g., a summary or a synopsis) of the context of the snippet 124 (e.g., what led up to the snippet 124). Such a recap may be useful, if, for example, the user 126 has not read a snippet 124 for a long period of time and has forgotten what has happened in the portion of the book leading up to the snippet 124. For example, the message 122 may include a "Recap" button 220 (or other element such as a link). The user 126 can select the "Recap" button 220 to indicate that he/she would like to receive a summary or recap of the circumstances leading up to the snippet 124. As described herein, if the user selects the "Recap" button 220, a corresponding request 128 may be sent to the snippet messaging module 120a, and the snippet messaging module 120a may generate a recap and provide it to the user 126. For example, the snippet messaging module 120a may generate and send to the user 126, a message 122 that includes the snippet 124 and a recap of the circumstances leading up to the snippet (also referred to as a "recap snippet message"). FIG. 2B illustrates an example GUI 230 displaying a recap snippet message ("recap message") 232 in accordance with one or more embodiments. As illustrated, a body of the recap message 232 may include a recap 234 and the snippet 124 (e.g., the same snippet 124 sent by the snippet message 122 from which the recap was requested). The recap 234 may include, for example, a description of the circumstances leading up to the snippet 124, such as a summary of the portion of the content 132 preceding the snippet 124. Thus, the user 126 may be able to open the recap message 232, read the recap 234, and proceed to reading the snippet 124. Such a recap message 232 may include other elements/features that are the same or similar to those of the snippet messages 122 described herein, such as a "Snippet Read" button 210, a "Snippet Not Read" button 212, a "Send Next Snippet Now" button 214, a listing of one or more of the snippets 124 previously sent to the user 126, and so forth and/or the user 126 may be able to indicate his/her interactions or desires via an e-mail reply to the recap message 232 (e.g., via replies of "sr," "snr," and/or "snsn").

In some embodiments, a follow-up message 122 can be sent automatically, without an explicit request from the user 126. For example, the snippet messaging module 120a may send a follow-up message 122 to the user 126 if it determines that the user 126 has not read the snippet 124 of the message 122 within a threshold amount of time. If, for example, the message 122 containing the snippet 124 has been sent to a user 126, a resend/recap threshold is set for 5 days, and the snippet messaging module 120a determines that the user 126 has not read the snippet 124 within 5 days of receiving the message 122, then the snippet messaging module 120a may resend the message 122 and/or the recap message 232 to the user 126. This may automatically provide a reminder to the user 126 to read the snippet 124, and/or a reminder of the context of the snippet 124.

In some embodiments, the point in time when to send a message 122 can be determined based on various factors, such as user requests for a snippet (e.g., the user 126 selects the "Send Next Snippet Now" button 214), interaction with the last message 122 (e.g., whether the user 126 has read the last snippet 124 sent to him/her), user preferences (e.g., a preferred time and/or frequency), the user's historical reading patterns (e.g., when does the user 126 typically read the snippets 124), and/or the like. In some embodiments, a message 122 with a snippet 124 can be sent in response to a user's explicit request for a snippet of content. For example, the snippet messaging module 120a may send a message 122 with a snippet 124 containing paragraphs 6-10 of a book to the user 126 in response to the user 126 selecting the "Send Next Snippet Now" button 214 in a message including a snippet 124 containing paragraphs 1-5 of the book.

In some embodiments, a message 122 can be sent in response to how users interact (or do not interact) with the last message 122. For example, the snippet messaging module 120a may send a message 122 with a snippet 124 containing paragraphs 6-10 of a book to the user 126 in response to determining that the user 126 read a snippet 124 containing paragraphs 1-5 of the book (e.g., the user 126 opened a message 122 including a snippet 124 containing paragraphs 1-5 of the book). As a further example, the snippet messaging module 120a may send a follow-up message 122 (e.g., a resend of the message 122 including a snippet containing paragraphs 1-5 of the book, or a recap message 232) to the e-mail account for the user 126 in response to determining that the user 126 has not yet read the snippet 124 containing paragraphs 1-5 of the book within a threshold period of time (e.g., 5 days) of a message 122 including the snippet 124 being sent to the user 126.

In some embodiments, a message 122 with a snippet 124 can be sent in accordance with user preferences, such as a message time or frequency. For example, if the user 126 sets account preferences that include a message time of 8:00 a.m. and a max frequency of daily, the snippet messaging module 120a may send a message 122 with a snippet 124 to the e-mail account for the user 126 at about 8:00 a.m. If, for example, the snippet messaging module 120a sends a message 122 including a snippet 124 containing paragraphs 1-5 of the book to the user 126 at 8:00 a.m. on Monday, and the snippet messaging module 120a determines that the user 126 read the snippet 124 at about 9:00 a.m. on Monday, then the snippet messaging module 120a may send another message 122 including a snippet 124 containing paragraphs 6-10 of the book to the user 126 at 8:00 a.m. on Tuesday.

In some embodiments, a message 122 with a snippet 124 can be sent in accordance with the historical reading patterns of the users 126. This may include, for example, times when users 126 typically read snippets 124, locations where users 126 typically read snippets 124, activities during which users 126 typically read snippets 124, and/or the like. For example, if the snippet messaging module 120a determines that a user reads at least a threshold amount (e.g., greater than about 50%) of the snippets 124 sent to him/her between about 8:00 a.m. and 9:00 a.m., then the snippet messaging module 120a may send a message 122 with a snippet 124 to the user 126 at about 8:00 a.m. so that the message 122 will be available to the user 126 during the time period when he/she is likely to read it. In some instances, such preferred reading times can be identified based on historical reading data for one or more users 126. For example, the snippet messaging module 120a may apply a machine learning algorithm that assesses historical user data 136 including when a user 126 reads the snippets 124 sent to him/her to identify preferred reading times for the user 126. As a further example, if the snippet messaging module 120a determines that a user 126 reads at least a threshold amount (e.g., greater than about 50%) of the snippets 124 sent to the user 126 while he/she is at a given location, such as his/her work location, then the snippet messaging module 120a may send a message 122 with a snippet 124 to the user 126 when it is determined that he/she is at or near that location so that the message 122 will be available to the user 126 during the time period when he/she is likely to read it. In some instances, such locations can be identified based on historical location and reading data for one or more users. For example, the snippet messaging module 120a may apply a machine learning algorithm that assesses historical user data 136 including where a user 126 is when he/she reads the snippets 124 sent to him/her to identify preferred reading locations for the user 126. As another example, if the snippet messaging module 120a determines that a user 126 reads at least a threshold amount (e.g., greater than about 50%) of the snippets 124 sent to him/her while he/she is engaged in a given activity, such as riding a bus, then the snippet messaging module 120a may send a message 122 with a snippet 124 to the user 126 when it is determined that he/she is engaged in that activity so that the message 122 will be available to the user 126 during the time period when he/she is likely to read it. In some instances, such activities can be identified based on historical activity and reading data for one or more users. For example, the snippet messaging module 120a may apply a machine learning algorithm that assesses historical user data 136 including where the user 126 is and what the user is doing when the user 126 reads the snippets 124 sent to him/her to identify preferred activities for the user 126.

Figure 3:
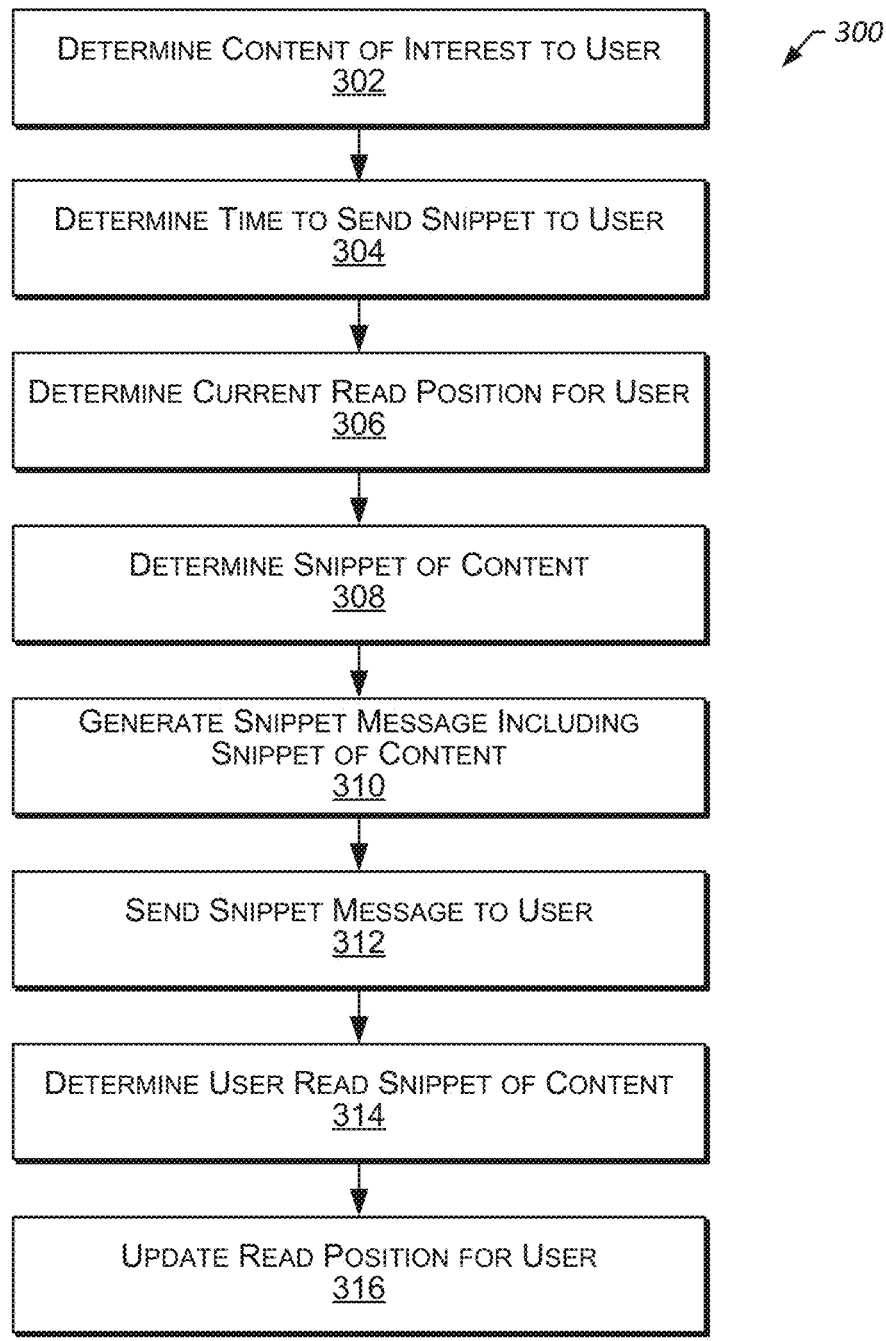
FIG. 3 is a flow diagram that illustrates an example method for providing snippets of content in accordance with one or more embodiments.

FIG. 3 is a flow diagram that illustrates an example method 300 for providing snippets of content in accordance with one or more embodiments. The method 300 may generally include determining content of interest to a user (block 302), determining a time to send a snippet to the user (block 304), determining a current read position for the user (block 306), determining a snippet of content (block 308), generating a snippet message including the snippet of the content (block 310), sending the snippet message to the user (block 312), determining that the user read the snippet of the content (block 314), and updating the read position for the user (block 316).

In some embodiments, determining the content of interest to a user (block 302) can include identifying a piece of content 132, such as a book, that the user is already engaged in consuming, or it is determined that the user may like to consume. For example, if the user information 134 includes a reading list that indicates that a user 126 has selected to read the book "The Adventures of Huckleberry Finn," determining the content of interest to the user 126 may include the snippet messaging module 120a determining that the user 126 is interested in the book "The Adventures of Huckleberry Finn."

In some embodiments, determining a time to send a snippet to the user (block 304) can include determining a time at which a snippet of the content of interest to the user 126 should be sent to the user, e.g., when should a snippet message 122 (or a recap message 232) be e-mailed to the user 126. In some embodiments, the timing of a message may be based on whether the user 126 has already read a preceding snippet 124 sent to him/her, the user's preferences (e.g., a preferred time of 8:00 a.m. and/or daily frequency), the user's historical reading patterns (e.g., times when the user 126 reads the snippets 124, the locations where the user 126 reads the snippets 124, the activities the user 126 engages in while reading the snippets 124, and/or the like), and/or the like. For example, determining a time to send a snippet 124 to the user 126 may include the snippet messaging module 120a determining a time of 8:00 a.m., Monday, Jan. 19, 2015, based at least in part on the user 126 selecting a preferred message time of 8:00 a.m., and a preferred snippet frequency of daily.

In some embodiments, determining a current read position for the user (block 306) can include determining a point in the content of interest to the user 126 up to which the user 126 has already read or otherwise consumed. The current read position may be maintained, for example, by the synching module 120b. In some embodiments, determining a current read position for a user 126 can include the snippet messaging module 120a querying the synching module 120b for the current read position for the user 126 in the content of interest, the synching module 120b retrieving the current read position for the user 126 in the content of interest from the data store 130, and the synching module 120b providing the current read position for the user 126 in the content of interest to the snippet messaging module 120a. For example, the snippet messaging module 120a may query the synching module 120b for the current read position for the user 126 in the book "The Adventures of Huckleberry Finn," and the synching module 120b may return a current read position of paragraph 55.

In some embodiments, determining a snippet of content (block 308) can include identifying a sub-portion of the content identified as being of interest to the user 126, starting at or near the current read position for the user 126 and being a given size/length. The length of the snippet of content may be identified based on a variety of factors, such as the preferences of the user 126 (e.g., a selected length or duration), the ability of the user 126 to consume content 132 (e.g., the reading speed of the user 126), a predetermined size (e.g., a fixed length), the natural breaks in the content 132 (e.g., where users 126 typically stop reading), and/or the like. If, for example, the reading position for the user 126 in the book "The Adventures of Huckleberry Finn" is paragraph 55, and the user 126 specifies a preferred snippet length of about 5 paragraphs (e.g., in the user preferences), then determining a snippet of content may include the snippet messaging module 120a generating or otherwise determining a snippet 124 that includes paragraphs 56-60 of the book "The Adventures of Huckleberry Finn."

In some embodiments, generating a snippet message including the snippet of content (block 310) can include generating a snippet message 122 that includes the determined snippet of content. The snippet message 122 may include, for example, a message to be transmitted by e-mail, text message, and/or the like. For example, generating a message 122 including the snippet of content may include the snippet messaging module 120*a* generating a message 122 that includes a snippet 124 that contains paragraphs 56-60 of the book "The Adventures of Huckleberry Finn. In some embodiments, the message 122 may be the same or similar to the message 122 illustrated in FIG. 2A.

In some embodiments, sending the snippet message to the user (block 312) can include sending a snippet message to an account (e.g., an e-mail account, a text message account and/or the like) associated with the user 126. For example, sending the snippet message to the user may include the snippet messaging module 120*a* sending the snippet message 122 that includes a snippet 124 that includes paragraphs 56-60 of the book "The Adventures of Huckleberry Finn" to an e-mail account for the user 126 (e.g., e-mailing the snippet message 122 to John.Doe@mail.com).

In some embodiments, determining that the user read the snippet of content (block 314) can include determining whether the user 126 interacted with the message 122 in a manner consistent with reading the snippet 124 contained in the message 122. For example, determining that the user read the snippet of content may include the snippet messaging module 120*a* determining that the user 126 read the snippet 124 in response to receiving an indication that the user 126 opened the snippet message 122 (e.g., receiving a read receipt and/or a request 128 generated by a beacon in the message 122), receiving an indication that the user 126 viewed the snippet message 122 for at least a threshold period of time, receiving an indication that the user 126 scrolled through at least a threshold amount of the snippet message 122, receiving a request 128 indicating selection of a "Snippet Read" button 210, a "Continue Reading" button 216, and/or a "See Supplemental Content" button 218, and/or the like in the message 122, receiving a reply to the message 122, including the strings "sr," "snsn," and/or the like.

In some embodiments, updating the read position for the user (block 316) can include updating the read position to align with or otherwise correspond to a location at or near the end of the snippet 124. If, for example, the snippet messaging module 120*a* determines that the user 126 has read the snippet 124 that includes paragraphs 56-60 of the book "The Adventures of Huckleberry Finn," then updating the read position for the user 126 may include the snippet messaging module 120*a* sending an indication of paragraph 60 to the synching module 120*b*, and the synching module 120*b* updating the stored value of the read position for the user 126 and the book "The Adventures of Huckleberry Finn" to paragraph 60.

The elements of the method 300 may be performed multiple times to provide a regular stream of snippets 124 to the user 126. For example, if the user preferences indicate a preferred snippet delivery time of 8:00 a.m. and a daily frequency, the above described steps may be performed in a similar manner to deliver a next snippet of content at 8:00 a.m. on Tuesday, Jan. 20, 2015. For example, the snippet messaging module 120*a* may e-mail a second snippet message 122 that includes a snippet 124 including paragraphs 61-65 of the book "The Adventures of Huckleberry Finn" to the e-mail account for the user 126.

Figure 4:
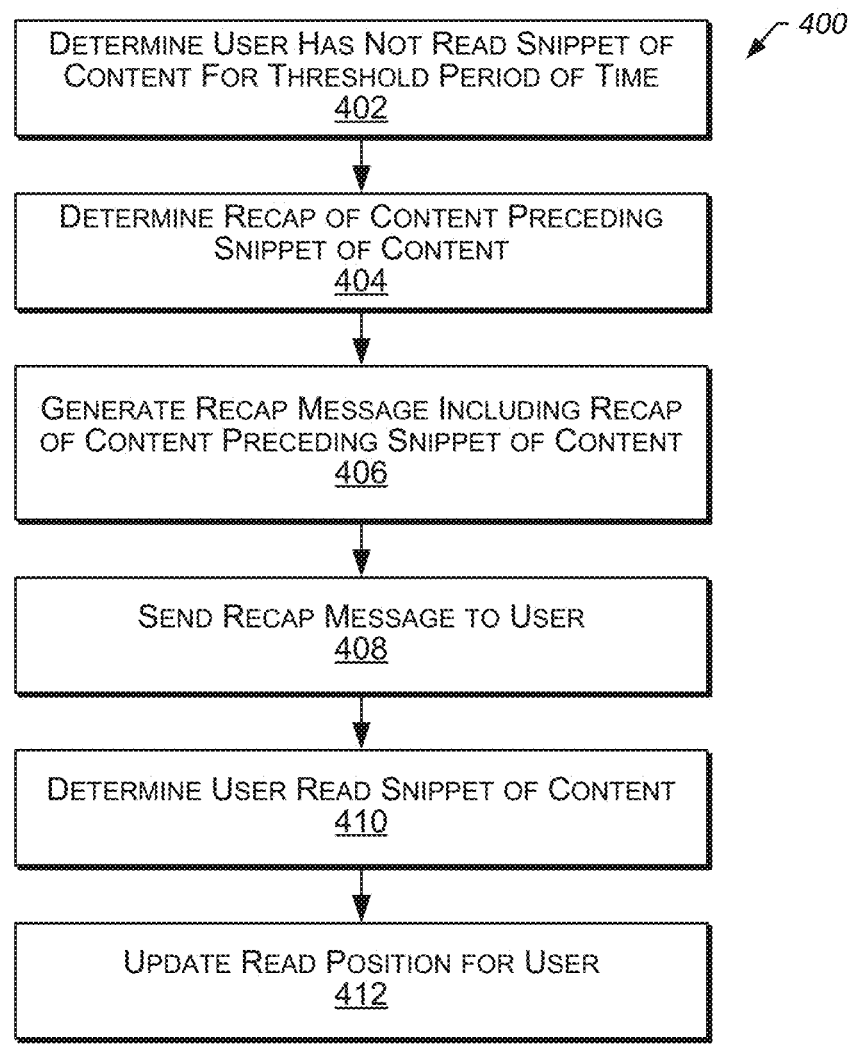
FIG. 4 is a flow diagram that illustrates an example method for providing recap messages in accordance with one or more embodiments.

FIG. 4 is a flow diagram that illustrates an example method 400 for providing recap messages in accordance with one or more embodiments. The method 400 may generally include determining that a user has not read a snippet of content for at least a threshold period of time (block 402), determining a recap of the content preceding the snippet of content (block 404), generating a recap message including a recap of the content preceding the snippet of content (block 406), sending the recap message to the user (block 408), determining that the user read the snippet of content (block 410), and updating the read position for the user (block 412).

In some embodiments, determining that a user has not read a snippet of content for at least a threshold period of time (block 402) can include determining that a user 126 has not read a snippet 124 of a message 122 delivered to the user 126 for at least a threshold period of time. If, for example, the snippet message 122 containing the snippet 124 has been sent to a user 126 by the snippet messaging module 120*a*, a resend/recap threshold is set for 5 days, and the snippet messaging module 120*a* determines that the user 126 has not read the snippet 124 within 5 days of receiving the message 122, then the snippet messaging module 120*a* may determine that the user 126 has not read the snippet 124 for at least the specified threshold period of time.

In some embodiments, determining a recap of the content preceding the snippet of content (block 404) can include determining a summary or a synopsis for the snippet 124, such as a summary or a synopsis of the portion of the content 132 preceding the snippet 124. For example, if the snippet messaging module 120*a* determines that the snippet 124 that includes paragraphs 56-60 of the book "The Adventures of Huckleberry Finn" has not been read for at least a threshold period of time, then the snippet messaging module 120*a* may generate a recap 234 including a summary of the portion of the content 132 preceding the snippet 124, such as a summary of paragraphs 50-55 of the book "The Adventures of Huckleberry Finn."

In some embodiments, generating a recap message including the recap of the content preceding the snippet (block 406) can include generating a recap message 232 that includes the recap 234 of the content preceding the snippet 124 of the content 132. The recap message 232 may include, for example, a message to be transmitted by e-mail, text message, and/or the like. For example, generating a recap message including the recap of the content preceding the snippet may include the snippet messaging module 120*a* generating or otherwise determining a recap message 232 that includes a recap 234 containing a summary or a synopsis of the portion of the content 132 preceding the snippet 124, such as a summary of paragraphs 50-55 of the book "The Adventures of Huckleberry Finn," and the snippet 124 that includes paragraphs 56-60 of the book "The Adventures of Huckleberry Finn." In some embodiments, the message 122 may be the same or similar to the recap message 232 illustrated in FIG. 2B.

In some embodiments, sending the recap message to the user (block 408) can include sending the recap message 232 to an account (e.g., an e-mail account and/or a text message account) associated with the user 126. For example, sending the recap message to the user may include the snippet messaging module 120*a* sending the recap message 232 (e.g., that includes a recap 234 containing a summary or a synopsis of the portion of the content 132 preceding the snippet 124, such as a summary of paragraphs 50-55 of the book "The Adventures of Huckleberry Finn," and the snippet 124 that includes paragraphs 56-60 of the book "The Adventures of Huckleberry Finn") to an e-mail account for the user 126 (e.g., e-mailing the recap message 232 to John.Doe@mail.com).

In some embodiments, determining that the user read the snippet of content (block 410) can be similar to that described with regard to block 314. For example, determining that the user read the snippet of content may include determining whether the user 126 interacted with the recap message 232 in a manner consistent with the user 126 reading the snippet 124 contained in the recap message 232. For example, determining that the user read the snippet of content may include the snippet messaging module 120a determining that the user 126 read the snippet 124 in response to receiving an indication that the user 126 opened the recap message 232 (e.g., receiving a read receipt and/or request 128 generated by a beacon in the recap message 232), receiving an indication that the user 126 viewed the recap message 232 for at least a threshold period of time, receiving an indication that the user 126 scrolled through at least a threshold amount of the recap message 232, receiving a request 128 indicating selection of a "Snippet Read" button 210, a "Continue Reading" button 216, and/or a "See Supplemental Content" button 218, and/or the like of the recap message 232, or receiving a reply to the recap message 232, including the strings "sr," "snsn," and/or the like.

In some embodiments, updating the read position for the user (block 412) can be similar to that described with regard to block 316. For example, updating the read position for the user can include updating the read position to align with or otherwise correspond to a location at or near the end of the snippet 124. If for example, the snippet messaging module 120a determines that the user 126 has read the snippet 124 in the recap message 232 that includes paragraphs 56-60 of the book "The Adventures of Huckleberry Finn," then updating the read position for user may include the snippet messaging module 120a sending an indication of paragraph 60 to the synching module 120b, and the synching module 120b updating the stored value of the read position for the user 126 and the book "The Adventures of Huckleberry Finn" to paragraph 60.

Accordingly, the embodiments described herein may enable a user 126 with a busy schedule to consume smaller portions of content (e.g., a few paragraphs of a book) during small breaks in his/her schedule, while still allowing the user to take in larger portions of the content (e.g., read a few chapters of the book) when his/her schedule allows. Although certain embodiments are described with regard to particular types of content (e.g., books) and particular types of delivery mechanisms (e.g., e-mailed messages) for the purpose of illustration, embodiments may include various types of content and/or delivery mechanisms. For example, a snippet 124 of a book may be delivered to a user 126 via a text messaged snippet message 122 in place of and/or in parallel with delivering the snippet 124 via an e-mailed snippet message 122. As a further example, a snippet 124 of a book may be delivered to a user 126 in an audio format, such as an audible reading of the text of the snippet 124 (e.g., a snippet 124 of an audio-book). Such an audio snippet 124 may be delivered as an audio file attached to a snippet message 122 (e.g., attached to an e-mail or a text message). In some embodiments, such an audio file may be delivered to a user 126 via a call to the user 126 and/or a voice mail left for the user 126. Thus, for example, the user 126 may listen to the audio version of the snippet 124 while traveling.

It will be appreciated that the methods 300 and 400 are example embodiments of methods that may be employed in accordance with the techniques described herein. The methods 300 and 400 may be modified to facilitate variations of their implementation and use. The order of the methods 300 and 400 and the operations provided therein may be changed, and various elements may be added, reordered, combined, omitted, modified, etc. Portions of the methods 300 and 400 may be implemented in software, hardware, or a combination thereof. Some or all of the portions of the methods 300 and 400 may be implemented by one or more of the processors/modules/applications described herein.

Figure 5:
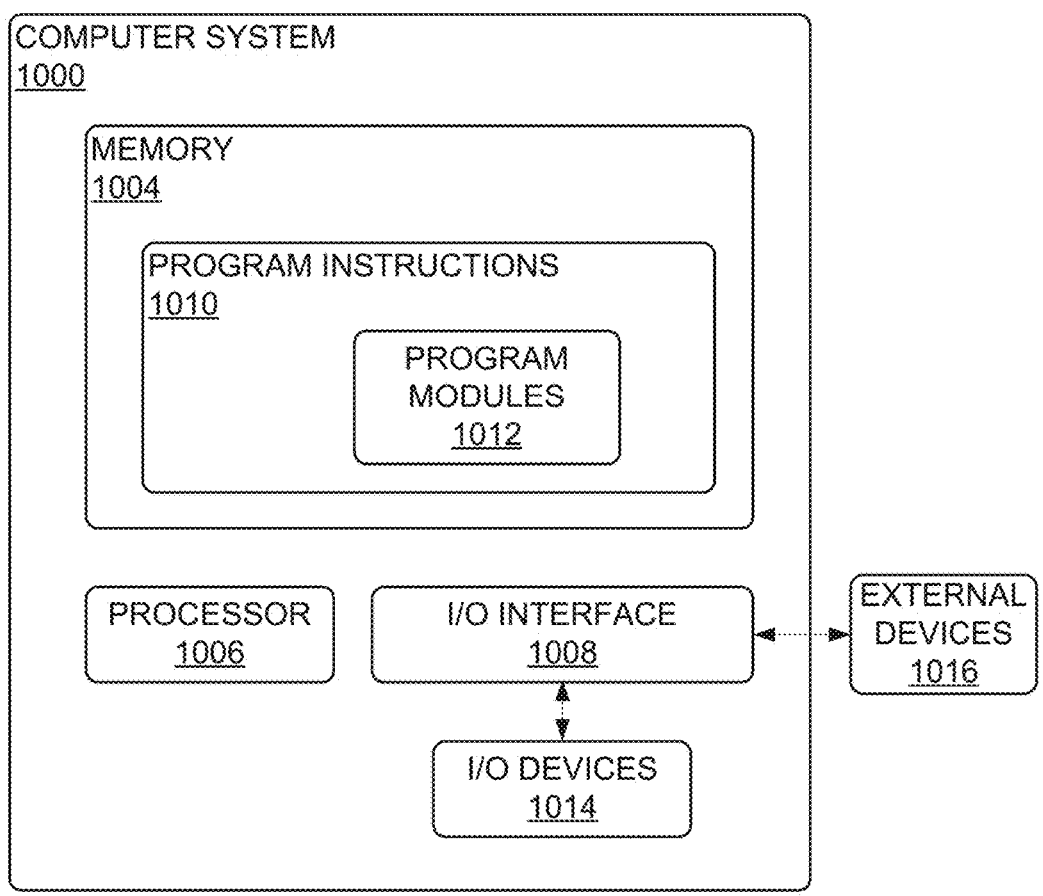
FIG. 5 is a diagram that illustrates an example computer system in accordance with one or more embodiments.

FIG. 5 is a diagram that illustrates an example computer system 1000 in accordance with one or more embodiments. In some embodiments, the computer system 1000 may include a memory 1004, a processor 1006, and an input/output (I/O) interface 1008. The memory 1004 may include non-volatile memory (e.g., flash memory, read-only memory (ROM), programmable read-only memory (PROM), erasable programmable read-only memory (EPROM), electrically erasable programmable read-only memory (EEPROM)), volatile memory (e.g., random access memory (RAM), static random access memory (SRAM), synchronous dynamic RAM (SDRAM)), bulk storage memory (e.g., CD-ROM and/or DVD-ROM, hard drives), and/or the like. The memory 1004 may include a non-transitory computer-readable storage medium having program instructions 1010 stored therein. The program instructions 1010 may include program modules 1012 (e.g., including subsets of program instructions 1010) that are executable by a computer processor (e.g., the processor 1006) to cause the functional operations (e.g., methods/routines/processes) described herein, including those described with regard to the methods 300 and 400. The program instructions 1010 may include, for example, program modules 1012. The program modules 1012 may include the snippet messaging module 120a and/or the synching module 120b. The processor 1006 may be any suitable processor capable of executing/performing program instructions. The processor 1006 may include a central processing unit (CPU) that carries out program instructions (e.g., the program instructions of the program module(s) 1012) to perform the arithmetical, logical, and input/output operations described herein. The processor 1006 may include one or more processors. The I/O interface 1008 may provide an interface for communication with one or more I/O devices 1014, such as a joystick, a computer mouse, a keyboard, a display screen (e.g., an electronic display for displaying a graphical user interface (GUI), and/or the like. The I/O devices 1014 may include one or more of the user input devices. The I/O devices 1014 may be connected to the I/O interface 1008 via a wired or a wireless connection. The I/O interface 1008 may provide an interface for communication with one or more external devices 1016, such as other computers, networks, and/or the like.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments. It is to be understood that the forms of the embodiments shown and described herein are to be taken as examples of embodiments. Elements and materials may be substituted for those illustrated and described herein, parts and processes may be reversed or omitted, and certain features of the embodiments may be utilized independently, all as would be apparent to one skilled in the art after having the benefit of this description of the embodiments. Changes may be made in the elements described herein without departing from the spirit and scope of the embodiments as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include," "including," and "includes" mean including, but not limited to. As used throughout this application, the singular forms "a", "an," and "the" include plural referents unless the content clearly indicates otherwise. Thus, for example, reference to "an element" may include a combination of two or more elements. As used throughout this application, the phrase "based on" does not limit the associated operation to being solely based on a particular item. Thus, for example, processing "based on" data A may include processing based at least in part on data A and based at least in part on data B unless the content clearly indicates otherwise. As used throughout this application, the term "from" does not limit the associated operation to being directly from. Thus, for example, receiving an item "from" an entity may include receiving an item directly from the entity or indirectly from the entity (e.g., via an intermediary entity). Unless specifically stated otherwise, as apparent from the discussion, it is appreciated that throughout this specification discussions utilizing terms such as "processing," "computing," "calculating," "determining," or the like refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical, electronic or magnetic quantities within memories, registers, or other information storage devices, transmission devices, or display devices of the special purpose computer or similar special purpose electronic processing/computing device.

What is claimed is:

1. A computer-implemented method for providing messages including snippets of book content, the method comprising:
    calculating a length of content to send to a user account based at least in part on a reading speed associated with the user account;
    identifying a time to send a snippet of content of a book to an electronic mail (e-mail) address of the user;
    identifying a reading position for the user, the reading position for the user being a location in the book to which the user has read;
    identifying the snippet, wherein the snippet comprises a sub-portion of text of the book that starts at or near the reading position and ends at a snippet end position, wherein the sub-portion is at least partially unconsumed and is equal to the length;
    generating a snippet message comprising the snippet, wherein the snippet message comprises an embedded image tag that generates a request identifying the snippet message when the snippet message is opened;
    sending the snippet message to the e-mail address for the user at the time;
    determining, based at least in part on data associated with the request, a presentation length of time for the snippet message;
    identifying, based at least in part on the presentation length of time, the length, and the reading speed, that the user has not read the snippet message; and
    resending the snippet message.

2. The method of claim 1, further comprising:
    identifying an updated reading position for the user that is associated with the snippet end position, the updated reading position for the user being a second location in the book to which the user has read;
    identifying a second time to send a second snippet of the content of the book to the user;
    identifying a second snippet comprising a second sub-portion of the text of the book that starts at or near the updated reading position and ends at a second snippet end position;
    generating a second snippet message comprising the second snippet;
    sending the second snippet message to the e-mail address for the user at the second time;
    determining that the second snippet of the second snippet message has been read; and
    identifying, in response to determining that the second snippet of the second snippet message has been read, a second updated reading position for the user that is associated with the second snippet end position, the second updated reading position for the user being a third location in the book to which the user has read.

3. The method of claim 1, further comprising determining the snippet end position to be a natural break in the text of the book that occurs after the reading position, and wherein the natural break is a location in the book identified using historical locations where one or more users have stopped reading.

4. The method of claim 1, wherein resending the snippet message comprises sending a recap message that comprises:
    a summary of at least a portion of the book preceding the reading position in addition to the snippet message.

5. A computer-implemented method, comprising:
    identifying a first portion of content consumed by a user;
    identifying a length of content to send to a user account based at least in part on a reading speed associated with the user account;
    sending a second portion of content to the user account based at least in part on the first portion of content, wherein the second portion of content is a snippet of content that is at least partially unconsumed, and wherein the second portion of content is equal to the length;
    determining a presentation length of time of the second portion of content;
    identifying, based at least in part on the presentation length of time, the length, and the reading speed, that the user has not read the second portion of content; and
    resending the second portion of content.

6. The method of claim 5, wherein sending the second portion of content comprises sending, to an electronic mail (e-mail) address associated with the user account, an e-mail message comprising text of the snippet.

7. The method of claim 5, wherein sending the second portion of content comprises sending, to a text message address associated with the user account, a text message comprising text of the snippet.

8. The method of claim 5, wherein sending the second portion of content comprises sending, to the user account, a voice message comprising an audible recitation of the snippet.

9. The method of claim 5, wherein identifying the first portion of content consumed by the user comprises identifying a book associated with the user account.

10. The method of claim 5, further comprising identifying a position associated with a location in the content to which the user has read.

11. The method of claim 5, further comprising identifying a snippet end position to be a break in text of the content that occurs after position to which the user has read.

12. The method of claim 11, further comprising identifying, using historical content consumption information for one or more other users, that the break is a natural break in the content where the one or more other users have stopped consuming content.

13. The method of claim 5, wherein the length is further based at least in part on a user preference that indicates a preferred snippet length.

14. The method of claim 5, wherein sending the second portion of content comprises sending an electronic message comprising one or more interactive elements that are user selectable to navigate to the content.

15. The method of claim 5, wherein resending the second portion of content comprises sending an electronic message comprising one or more interactive elements that are user selectable to indicate whether the user has or has not consumed the snippet.

16. The method of claim 5, further comprising:
   determining that the user has consumed the second portion of content;
   identifying an updated position that is associated with a snippet end position;
   identifying a third portion of content starting at or near the updated position and ending at a second snippet end position; and
   sending the third portion of content.

17. A system, comprising:
   at least one processor; and
   memory comprising program instructions stored thereon that are executable by the at least one processor to cause:
      identifying a first portion of content consumed by a user;
      identifying an end point of the first portion of content;
      identifying a length of content to send to a user account based at least in part on a reading speed associated with the user account;
      sending a second portion of content to the user account based at least in part on the first portion of content, wherein the second portion of content is a snippet of content that is at least partially unconsumed, and wherein the second portion of content is equal to the length;
      determining a presentation length of time of the second portion of content;
      identifying, based at least in part on the presentation length of time, the length, and the reading speed, that the user has not read the second portion of content; and
      causing presentation of a third portion of content that starts at the end point.

18. The system of claim 17, wherein sending the second portion of content comprises sending, to an e-mail address associated with the user account, an e-mail message comprising text of the snippet.

19. The system of claim 17, the program instructions further executable by the at least one processor to cause:
   determining that the user has consumed the third portion of content;
   identifying an updated position that is associated with a snippet end position;
   identifying a fourth portion of content starting at or near the updated position and ending at a second snippet end position; and
   sending the fourth portion of content.

20. The system of claim 17, the program instructions further executable by the at least one processor to cause:
   sending a reminder to the user account, wherein the reminder comprises an indication that the user has not read the second portion of content.

* * * * *